United States Patent [19]
Watanabe

[11] Patent Number: 5,257,306
[45] Date of Patent: Oct. 26, 1993

[54] VIDEO TELECONFERENCING SYSTEM

[75] Inventor: Satoru Watanabe, Kawasaki, Japan

[73] Assignee: Fujitsu Limited, Kawasaki, Japan

[21] Appl. No.: 888,186

[22] Filed: May 26, 1992

[51] Int. Cl.$^5$ .................. H04N 7/14; H04M 11/00
[52] U.S. Cl. ........................ 379/53; 379/54; 358/85
[58] Field of Search .............. 379/53, 54, 96, 202; 358/85

[56] References Cited

FOREIGN PATENT DOCUMENTS

| | | |
|---|---|---|
| 0033985 | 2/1988 | Japan . |
| 0086686 | 4/1988 | Japan . |
| 0071392 | 3/1989 | Japan . |
| 4-122184 | 4/1992 | Japan . |

OTHER PUBLICATIONS

S. Gale, "Human Aspects of Interactive Multimedia Communication", Interacting with Computers, vol. 2, No. 2 (1990), pp. 176–189.

*Primary Examiner*—Jin F. Ng
*Assistant Examiner*—Stella L. Woo

[57] ABSTRACT

A video teleconferencing system includes a plurality of terminals, a server including a storage for storing input information, and a network coupling the terminals to the server, where the input information is supplied from each terminal to other terminals from the server. Each terminal includes an input part including a first input part for inputting voice information and a second input part for inputting image information, where the voice information and the image information form the input information of the input part and the second input part generates a front image and an oblique image of a certain user of the terminal to which the input part belongs, a display part for displaying images of users of the terminals other than the terminal to which the display part belongs, and a processing part including a first part for accepting specifying information which specifies a terminal, and a second part for determining a kind of image to be displayed on the display part of each terminal other than the terminal to which the processing part belongs.

11 Claims, 22 Drawing Sheets

E/OR   F/F   A/F   B/O   C/O

F/OR   A/OR   B/F   C/O   D/O

VIDEO TELECONFERENCING SYSTEM

BACKGROUND OF THE INVENTION

The present invention generally relates to video teleconferencing systems, and more particularly to a video teleconferencing system which provides from a server a video teleconferencing service to a plurality of terminals which are coupled via a network.

Recently, video teleconferencing systems are used popularly. According to the video teleconferencing system, a plurality of terminals are coupled via a network and console information such as characters, voice information and image information are combined and exchanged among the terminals to enable a video teleconferencing. The video teleconferencing system is advantageous in that the system frees the users from being restricted by the conference location, and for this reason, there are demands to improve the video teleconferencing system by providing smooth progress and presence.

FIG. 1 shows an essential part of an example of a conventional video teleconferencing system. In FIG. 1, only two terminals 200 are shown, and each terminal 200 includes a camera 201 and a display 202. The camera 201 is provided above the display 202, and the terminal 200 transmits image information related to the user by picking up the user on this camera 201.

However, according to this system shown in FIG. 1, it is impossible to achieve eye-to-eye contact between users A and B. In other words, in order for the user A to send a front image of himself to the user B, the user A must shift his eyes from the display 202 and look upward towards the camera 201. On the other hand, in order for the user B to see the user A, the user B must look straight at the display 202. As a result, the user B picked up by the camera 201 in this state appears on the display 202 on the side of the user A as if the user B is looking down, and there is no eye-to-eye contact between the users A and B.

FIG. 2 shows an essential part of another example of the conventional video teleconferencing system. In FIG. 2, those parts which are the same as those corresponding parts in FIG. 1 are designated by the same reference numerals, and a description thereof will be omitted. In FIG. 2, a semitransparent mirror (half mirror) 203 is provided in front of the display 202 at each terminal 200. The camera 201 is provided above the semitransparent mirror 203.

According to this system shown in FIG. 2, it is possible to realize eye-to-eye contact between the users A and B. However, if the video teleconference involves three or more people, it becomes uncertain who is requesting eye-to-eye contact to who.

Therefore, the conventional video teleconferencing systems have problems in that it is either impossible to achieve eye-to-eye contact between two users or, it is uncertain who is requesting eye-to-eye contact to who in the case where the eye-to-eye contact is possible. As a result, it is difficult to ensure smooth progress of the video teleconference and provide presence at each of the terminals.

SUMMARY OF THE INVENTION

Accordingly, it is a general object of the present invention to provide a novel and useful video teleconferencing system in which the problems described above are eliminated.

Another and more specific object of the present invention is to provide a video teleconferencing system comprising a plurality of terminals, a server including storage means for storing input information, and a network coupling the terminals to the server, where the input information is supplied from each terminal to other terminals from the server. Each of the terminals comprise input means including a first input part for inputting voice information and a second input part for inputting image information, where the voice information and the image information form the input information of the input means and the second input part includes means for generating a front image and an oblique image of a certain user of the terminal to which the input means belongs, display means for displaying images of users of the terminals other than the terminal to which the display means belongs, and processing means including first means for accepting specifying information which specifies a terminal, and second means for determining a kind of image to be displayed on the display means of each terminal other than the terminal to which the processing means belongs. According to the video teleconferencing system of the present invention, it is possible for the user at each terminal to always be aware of who is requesting eye-to-eye contact with who. In addition, it is possible for a first user to promptly achieve the eye-to-eye contact with a second user if the second user is also requesting eye-to-eye contact with the first user. The eye-to-eye contact compensates for the lack of communication conventionally caused by the physical distance among the users of the terminals, and thus, it becomes possible to realize a video teleconference which closely resembles a conference which is held at a single location.

Other objects and further features of the present invention will be apparent from the following detailed description when read in conjunction with the accompanying drawings.

DESCRIPTION OF THE PREFERRED EMBODIMENTS

First, a description will be given of six important aspects of the present invention, by referring to FIGS. 3 through 5.

Figure 1:
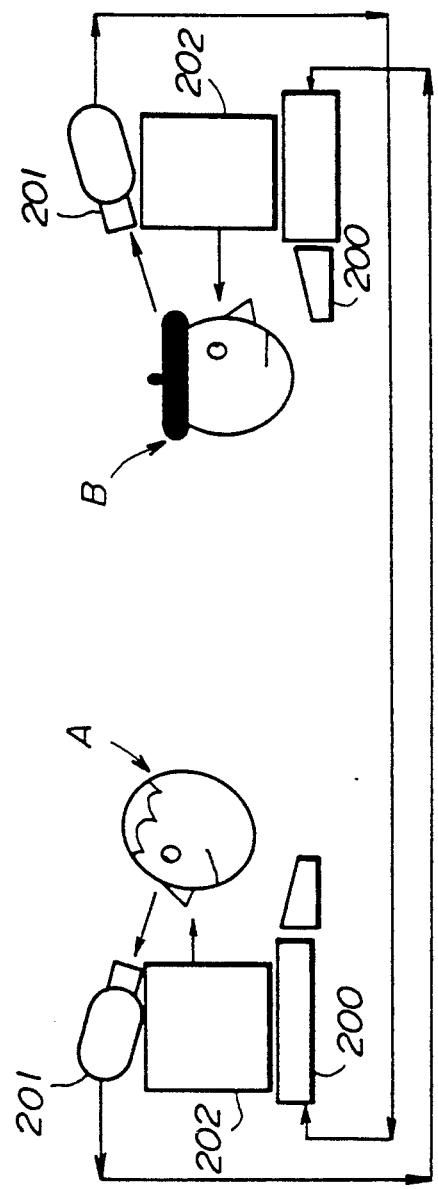
FIG. 1 is a system block diagram showing an essential part of an example of a conventional video teleconferencing system.
Figure 2:
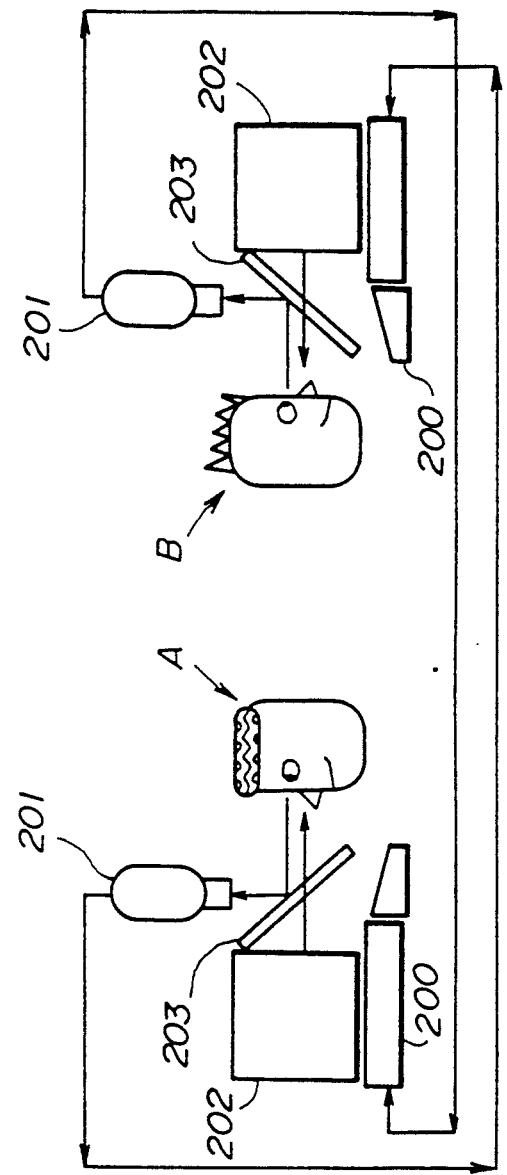
FIG. 2 is a system block diagram showing an essential part of another example of the conventional video teleconferencing system.
Figure 3:
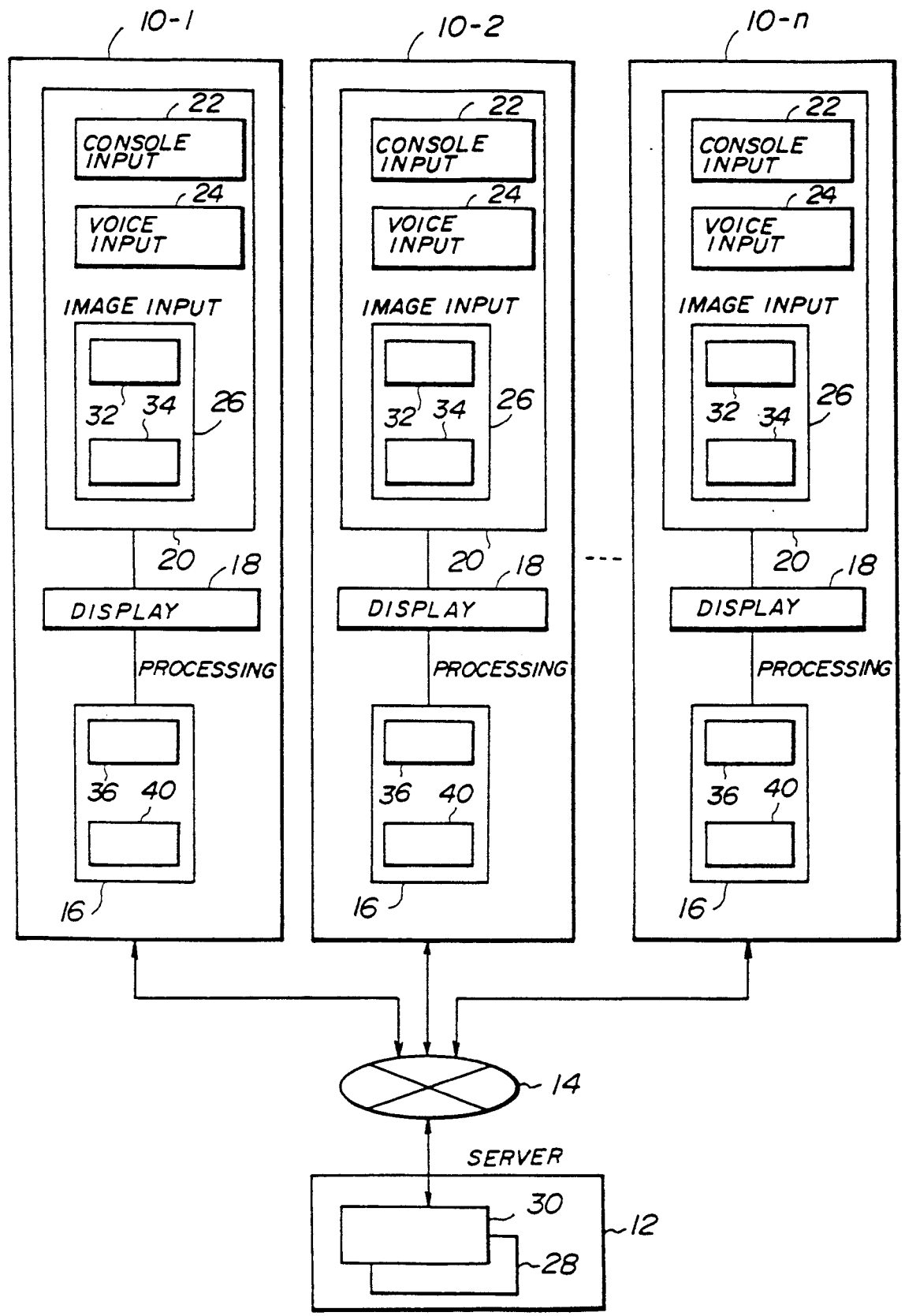
FIGS. 3 through 8 respectively are system block diagrams for explaining six important aspects of the present invention.

FIG. 3 is a system block diagram for explaining a first aspect of the present invention. In FIG. 3, a plurality of terminals 10-1, 10-2, . . . , and 10-n are coupled to a server 12 via a network 14. Each of the terminals 10-1, 10-2, . . . , and 10-n include a processing part 16, a display part 18 and an input part 20. The input part 20 includes a console input part 22 for making a console input, a voice input part 24 for making a voice input, and an image input part 26 for making an image input.

The server 12 includes a storage part 30 for storing the input information transmitted from the input part 20 of each of the terminals 10-1, 10-2, . . . , and 10-n. The server 12 may also be provided with an editing part 28 for editing the input information. Of course, the editing may be made in each terminal. According to this video teleconferencing system, the server 12 provides the input information from each of the terminals 10-1, 10-2, . . . , and 10-n to other terminals 10-1, 10-2, . . . , and 10-n.

According to the first aspect of the present invention, the image input part 26 includes means 32 for generating a front image of the user using the terminal to which the image input part 26 belongs (hereinafter simply referred to as a terminal user), and means 34 for generating an oblique image of the user. The processing part 16 includes means 36 for accepting input of information specifying a user with whom the terminal user wishes to make a conversation, and means 40 for displaying the images of the users on the display part 18 so that the front image of the specified user and the oblique images of other users are displayed.

Figure 4:
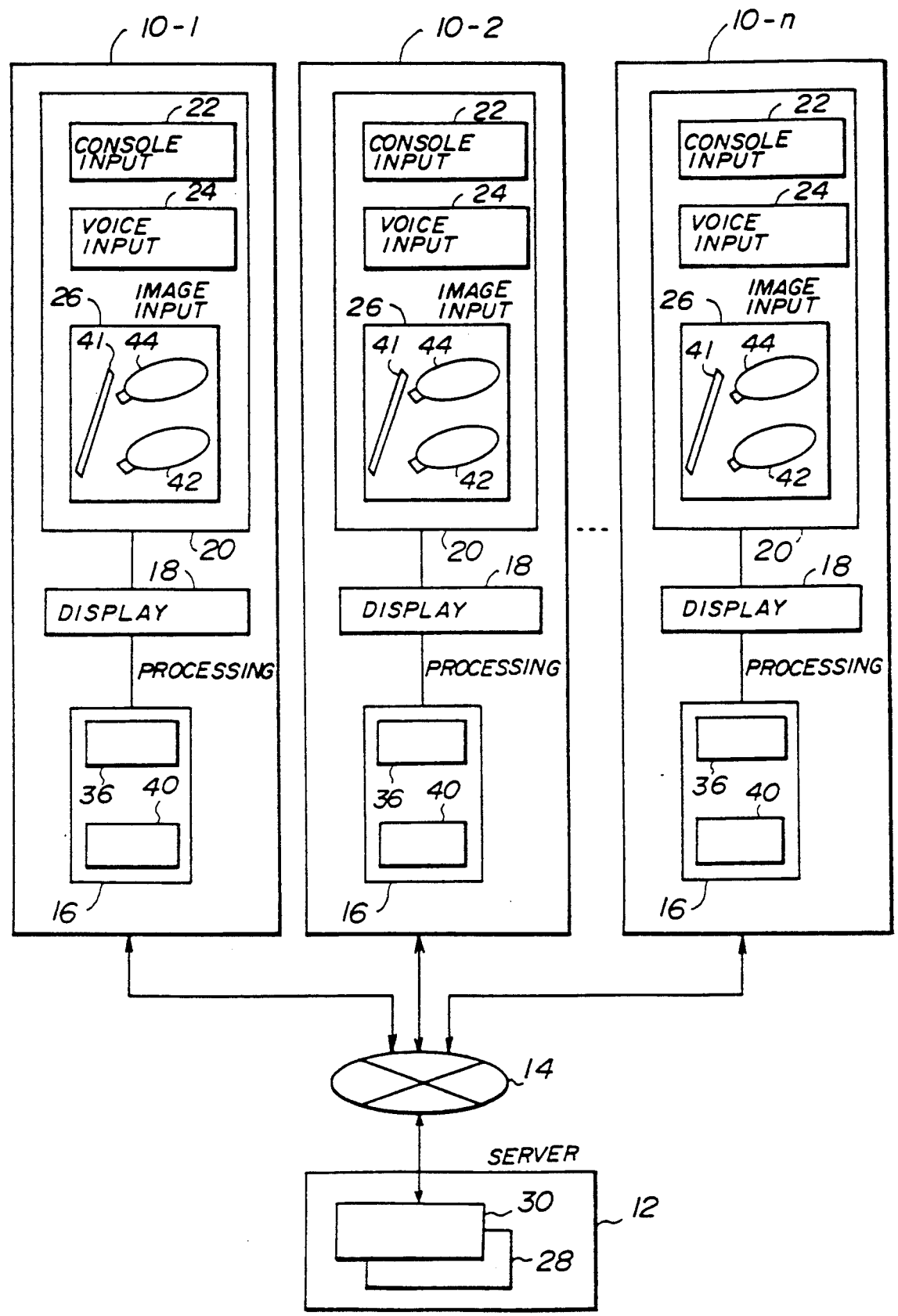

FIG. 4 is a system block diagram for explaining a second aspect of the present invention. In FIG. 4, those parts which are the same as those corresponding parts in FIG. 3 are designated by the same reference numerals, and a description thereof will omitted.

According to this second aspect of the present invention, the image input part 26 includes a semitransparent mirror (half mirror) 41 which is inserted between the terminal user and the display part 18, a camera 42 for generating a front image of the terminal user via the semitransparent mirror 41, and a camera 44 for generating an oblique image of the terminal user.

Figure 5:
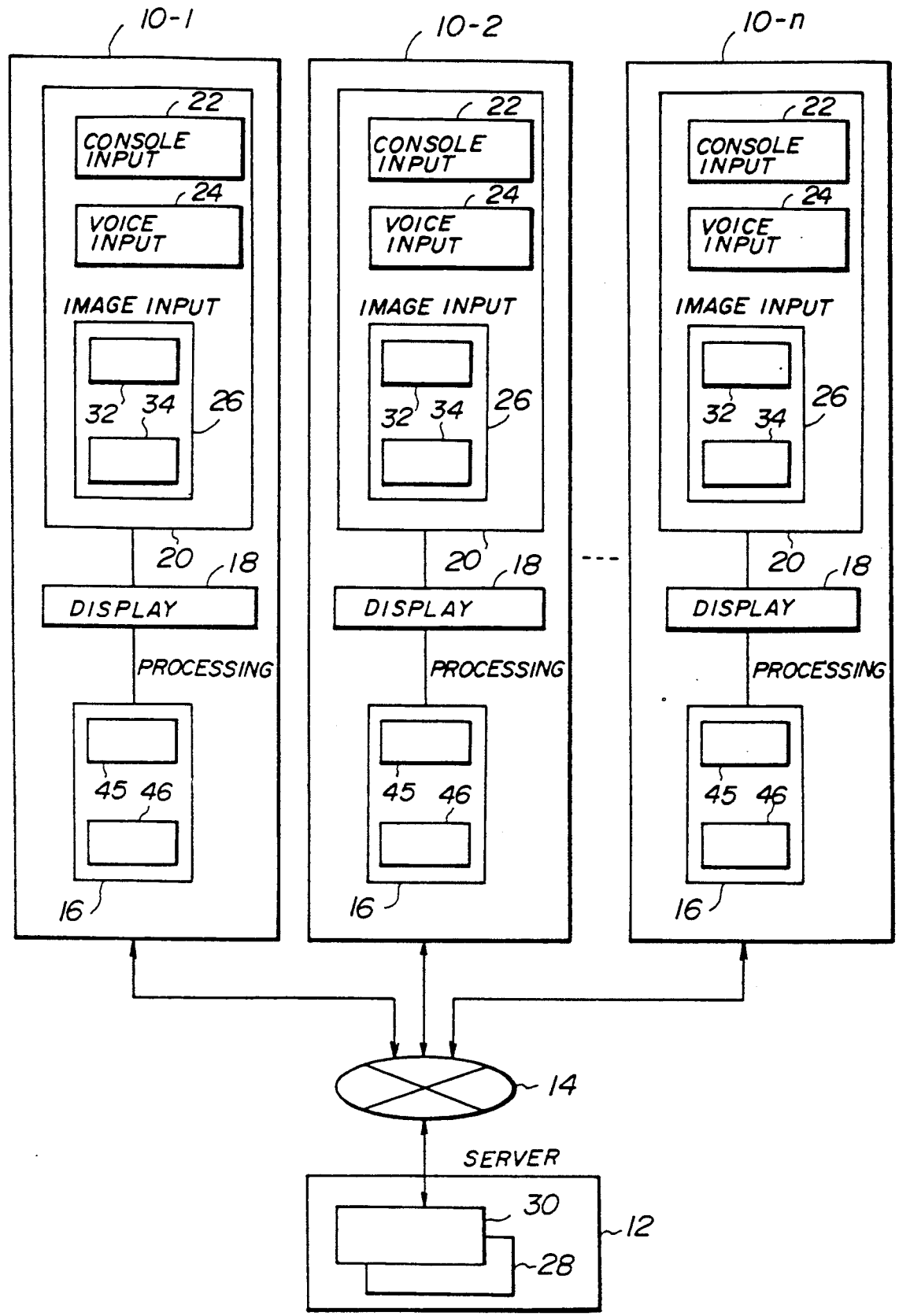

FIG. 5 is a system block diagram for explaining a third aspect of the present invention. In FIG. 5, those parts which are the same as those corresponding parts in FIG. 3 are designated by the same reference numerals, and a description thereof will omitted.

According to this third aspect of the present invention, the processing part 16 includes means 45 for displaying images of the other users on the display part 18 in a horizontal arrangement depending on a virtual user position relationship, and means 46 for inserting the image of the specified user at a predetermined position in the horizontal arrangement.

Figure 6:
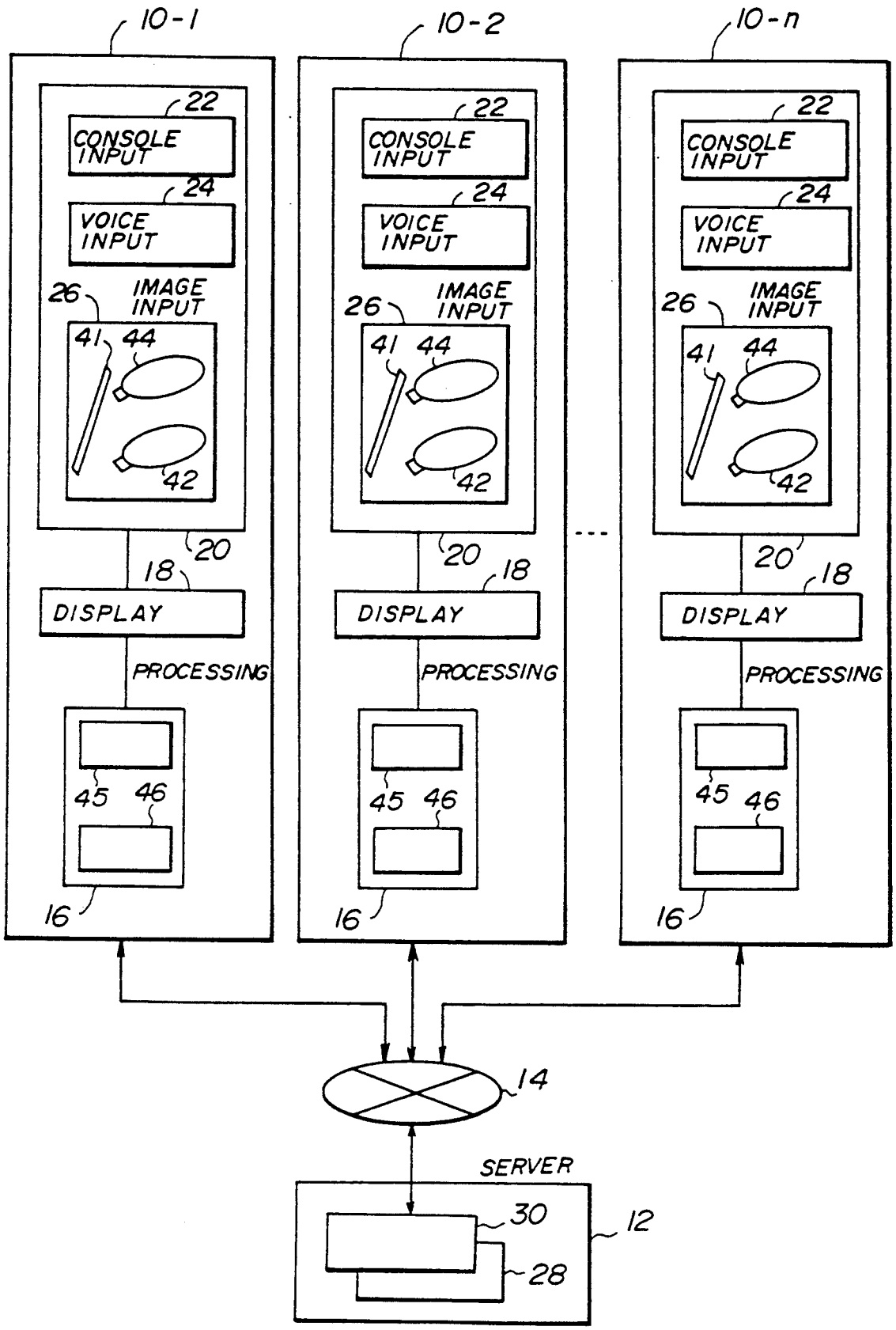

FIG. 6 is a system block diagram for explaining a fourth aspect of the present invention. In FIG. 6, those parts which are the same as those corresponding parts in FIGS. 4 and 5 are designated by the same reference numerals, and a description thereof will omitted.

According to this fourth aspect of the present invention, the input part 20 has the same construction as the input part 20 shown in FIG. 4, while the processing part 16 has the same construction as the processing part 16 shown in FIG. 5.

Figure 7:
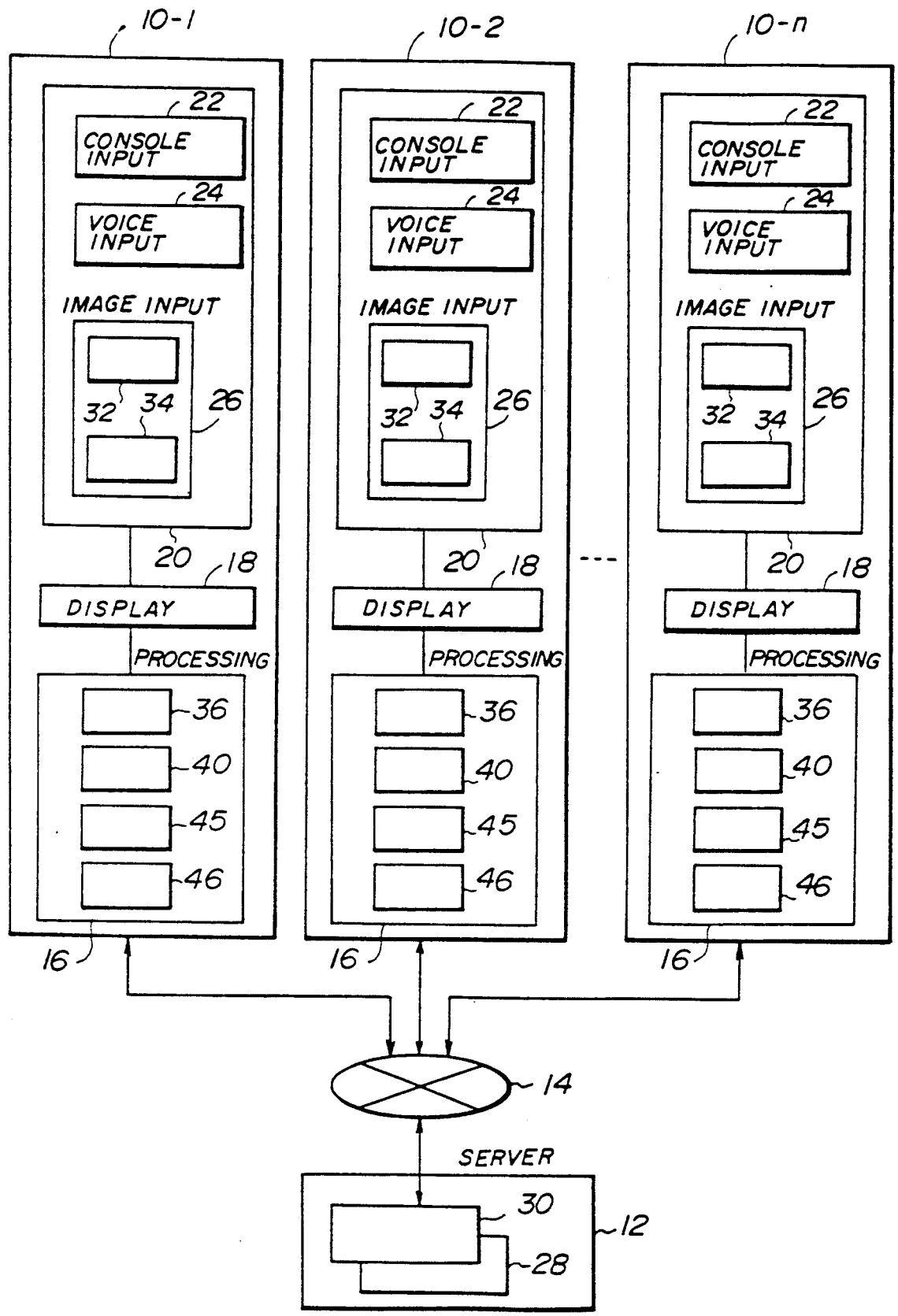

FIG. 7 is a system block diagram for explaining a fifth aspect of the present invention. In FIG. 7, those parts which are the same as those corresponding parts in FIGS. 3 and 5 are designated by the same reference numerals, and a description thereof will omitted.

According to this fifth aspect of the present invention, the processing part 16 includes means 36 for accepting input of information specifying the user with whom the terminal user wishes to make a conversation, means 40 for displaying the images of the users on the display part 18 so that the front image of the specified user and the oblique images of other users are displayed, means 45 for displaying images of the other users on the display part 18 in a horizontal arrangement depending on a virtual user position relationship, and means 46 for inserting the image of the specified user at a predetermined position in the horizontal arrangement.

Figure 8:
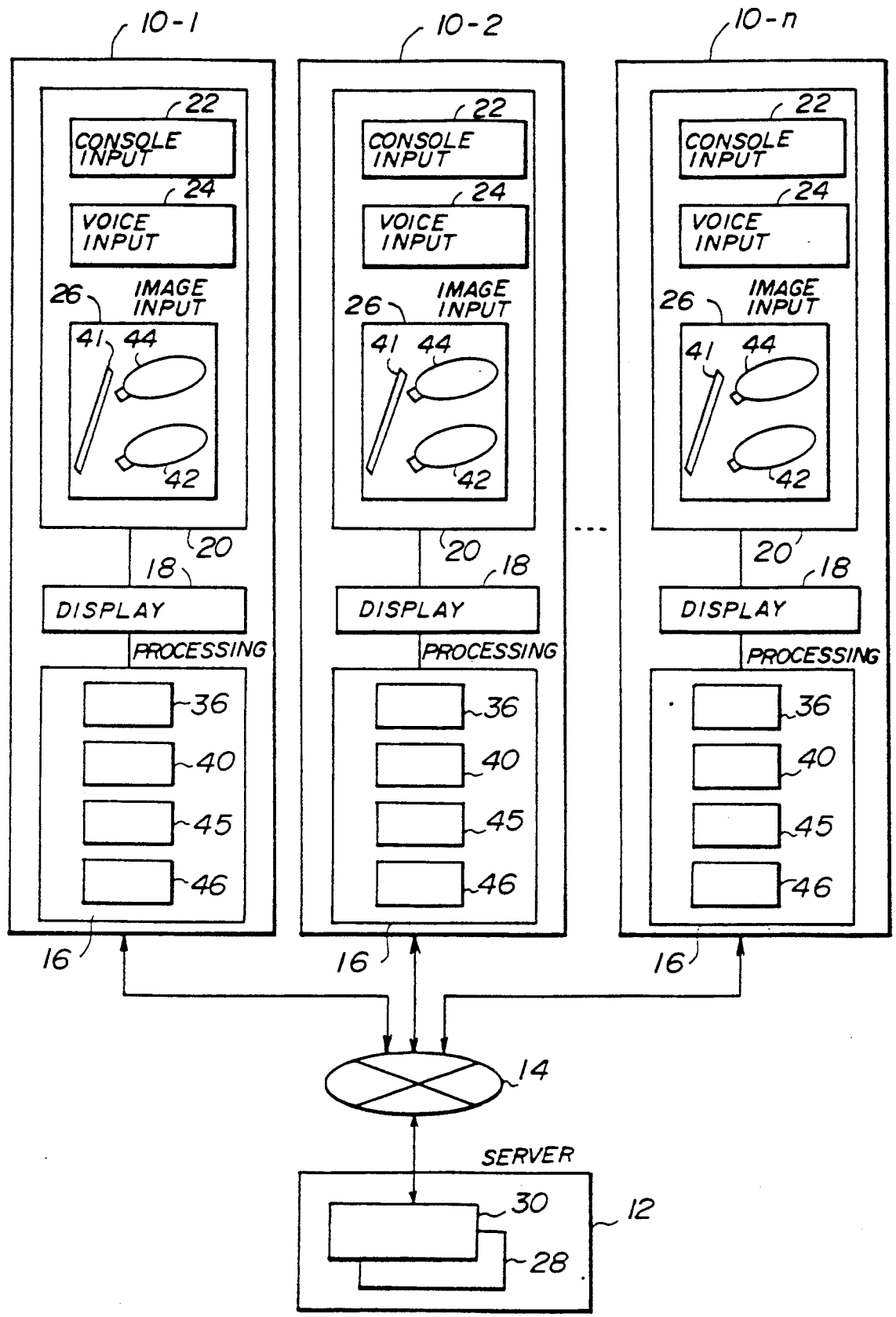

FIG. 8 is a system block diagram for explaining a sixth aspect of the present invention. In FIG. 8, those parts which are the same as those corresponding parts in FIGS. 3 through 5 are designated by the same reference numerals, and a description thereof will omitted.

According to this sixth aspect of the present invention, the input part 20 has the same construction as the input part 20 shown in FIG. 4, while the processing part 16 has the same construction as the processing part 16 shown in FIG. 7.

According to the present invention, two kinds of images, that is, the front image and the oblique image of the terminal user can be input from the image input part 20. Hence, it is possible to clarify the eye-to-eye contact relationship among the users attending the video teleconference by selectively displaying one of the two kinds of images at the processing part 16 of each terminal 10

In addition, when the terminal user requests eye-to-eye contact with another user, the image of the specified user can be arranged in a region of the display part 18 where the eye-to-eye contact is possible. Hence, it is possible to promptly realize eye-to-eye contact between two users upon request.

Furthermore, when a first user of a terminal requests eye-to-eye contact with a second user of another terminal, the front image of the first user is displayed at the terminal of the second user. On the other hand, if no eye-to-eye contact is requested, the oblique image of the first user is displayed at the terminal of the second user. Therefore, it is possible to clarify who is requesting eye-to-eye contact with who.

Moreover, whether or not to display the front or oblique image of each user and the position where each image is to be displayed may be determined from the eye-to-eye contact requests from the users and the virtual user position relationship which is set in advance. For this reason, the eye-to-eye contact request made from each user can be grasped immediately from the images displayed on the display part 18.

Figure 9:
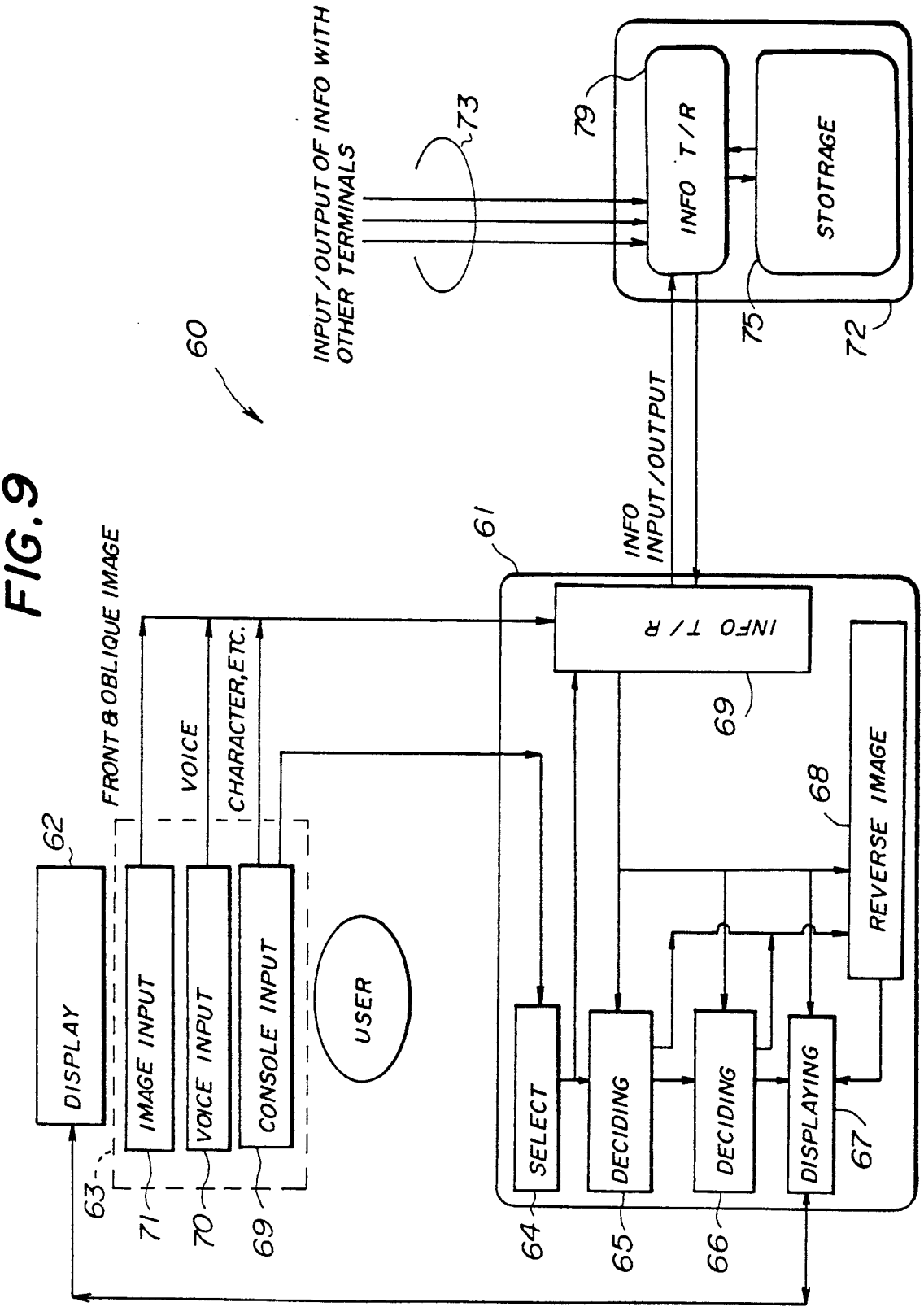
FIG. 9 is a system block diagram showing an essential part of an embodiment of a video teleconference system according to the present invention.

Next, a description will be given of an embodiment of the video teleconferencing system according to the present invention, by referring to FIG. 9. FIG. 9 shows one of a plurality of terminals 60 which participate in a video teleconference, a server 72, and a network 73 which couple the terminals 60 to the server 72.

The terminal 60 includes a processing part 61, a display part 62, and an input part 63. The processing part 61 includes a user selecting part 64, a user image deciding part 65, an eye-to-eye contact relationship display deciding part 66, a displaying part 67, a reversed image forming part 68, and an information transmitting/receiving part 69. The processing part 61 may be realized by a microprocessor, for example. On the other hand, the input part 63 includes a console input part 69 which makes a console input using a mouse or the like, a voice input part 70 for making a voice input, and an image input part 71 for making an image input.

The server 72 includes a storage 75 and an information transmitting/receiving part 79. The storage part 75 stores input information transmitted from each terminal 60, where the input information includes character information, voice information, image information and the like. On the other hand, the information transmitting/receiving part 79 is connected to the information transmitting/receiving part 69 of the terminal 60 and exchange information between the terminal 60 and the server 72. The information transmitting/receiving part 79 of the server 72 is also connected to the network 73.

In the input part 63, the console input part 69 accepts the console information input such as characters, and the voice information input part 70 accepts the voice information input. In addition, the image input part 71 inputs the front image and the oblique image of the terminal user by some means.

Figure 10:
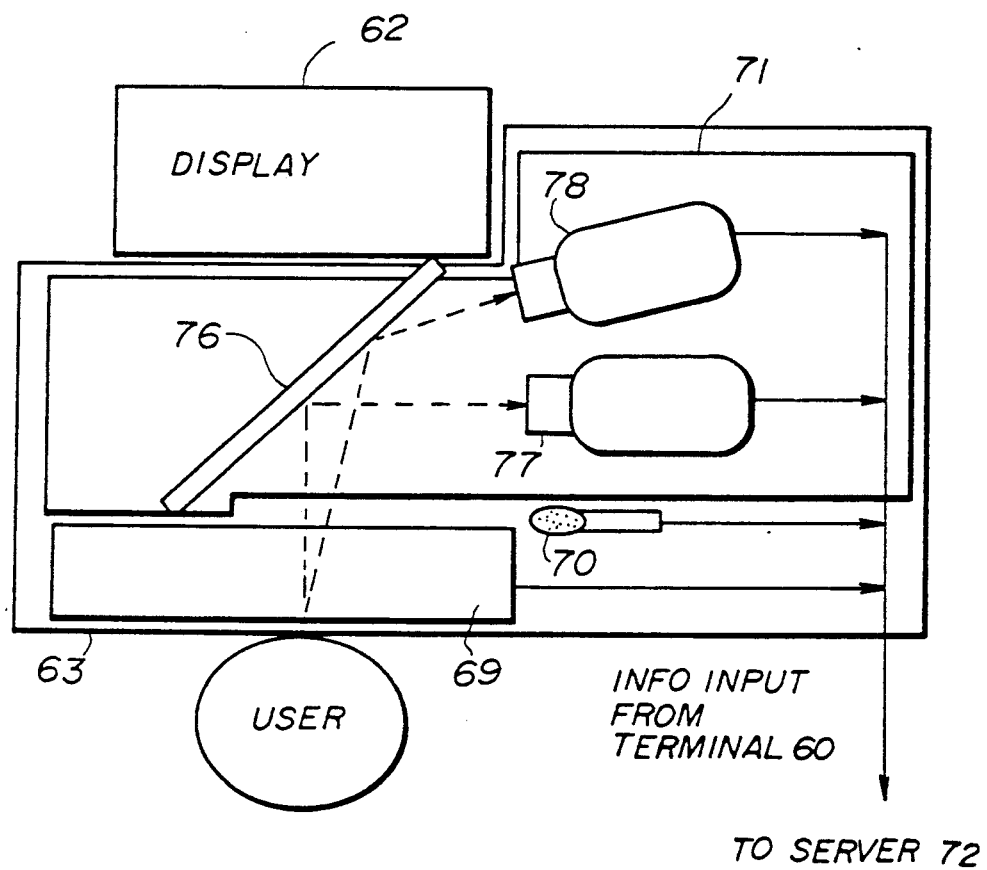
FIG. 10 is a plan view showing an embodiment of the arrangement of a display part and an input part shown in FIG. 9 together with the user.

FIG. 10 is a plan view of an embodiment of the arrangement of the display part 62 and the input part 63 shown in FIG. 9 together with the user. In FIG. 10, the image input part 71 includes a semitransparent mirror (half mirror) 76, a camera 77 for picking up a front image, and a camera 78 for picking up an oblique image. The semitransparent mirror 76 is provided between the display part 12 and the user at an angle of 45° when viewed from the user. The camera 77 is arranged on the side of the user at an angle of 90°, and picks up the front image of the user via the semitransparent mirror 76. On the other hand, the camera 78 is arranged on the side of the user at an angle other than 90°, and picks up the oblique image of the user via the semitransparent mirror 76. The information from each terminal 60 is supplied to the server 72 and is stored in the storage part 75.

As shown in FIG. 9, the user selecting part 64 accepts from the terminal user a selection input of the user name of the other terminal to whom the eye-to-eye contact is requested. For example, the console input part 69 includes a keyboard (not shown), and the user selecting part 64 receives the selection input from the keyboard. The user image display deciding part 65 decides the kind of image of each user and the display position of each user on the display part 62 depending on the selection (eye-to-eye contact request of all users) at each user electing part 64 of the terminals 60 and depending on the user virtual position relationship which is initially set in the storage part 75.

Furthermore, the eye-to-eye contact relationship display deciding part 66 fins a pair of users in an eye-to-eye contact relationship, and decides the link of the images and the use of the right-to-left reversed image. In other words, the pair of users presently in the eye-to-eye contact relationship is found from the eye-to-eye contact requests made of all of the users, and by displaying the right-to-left reversed image and the link, the display of the eye-to-eye contact relationship is decided. On the other hand, the displaying part 67 receives the decision from the deciding part 66 and displays the images of the users on the display part 62 by transferring thereto the front image, the oblique image and/or the oblique reversed image of each user from the storage part 75 and/or the reversed image forming part 68. The required image information is transferred from the storage part 75 and the reversed image forming part 68.

The reversed image forming part 68 receives instructions from the deciding parts 65 and 66, transfers the oblique image from the storage part 75, and forms the right-to-left reversed image related to the oblique image of the user.

Therefore, the terminal user can request eye-to-eye contact with a desired user, and the eye-to-eye contact is achieved if the desired user also request eye-to-eye contact with the terminal user. In addition, the eye-to-eye contact relationships of other users can also be observed from the display. Further, because the virtual user position relationship does not change among the users, it becomes possible to make conversion during the video teleconference as if all of the participating users are present at the same conference room.

Next, a description will be given of the operation of this embodiment.

Figure 11:
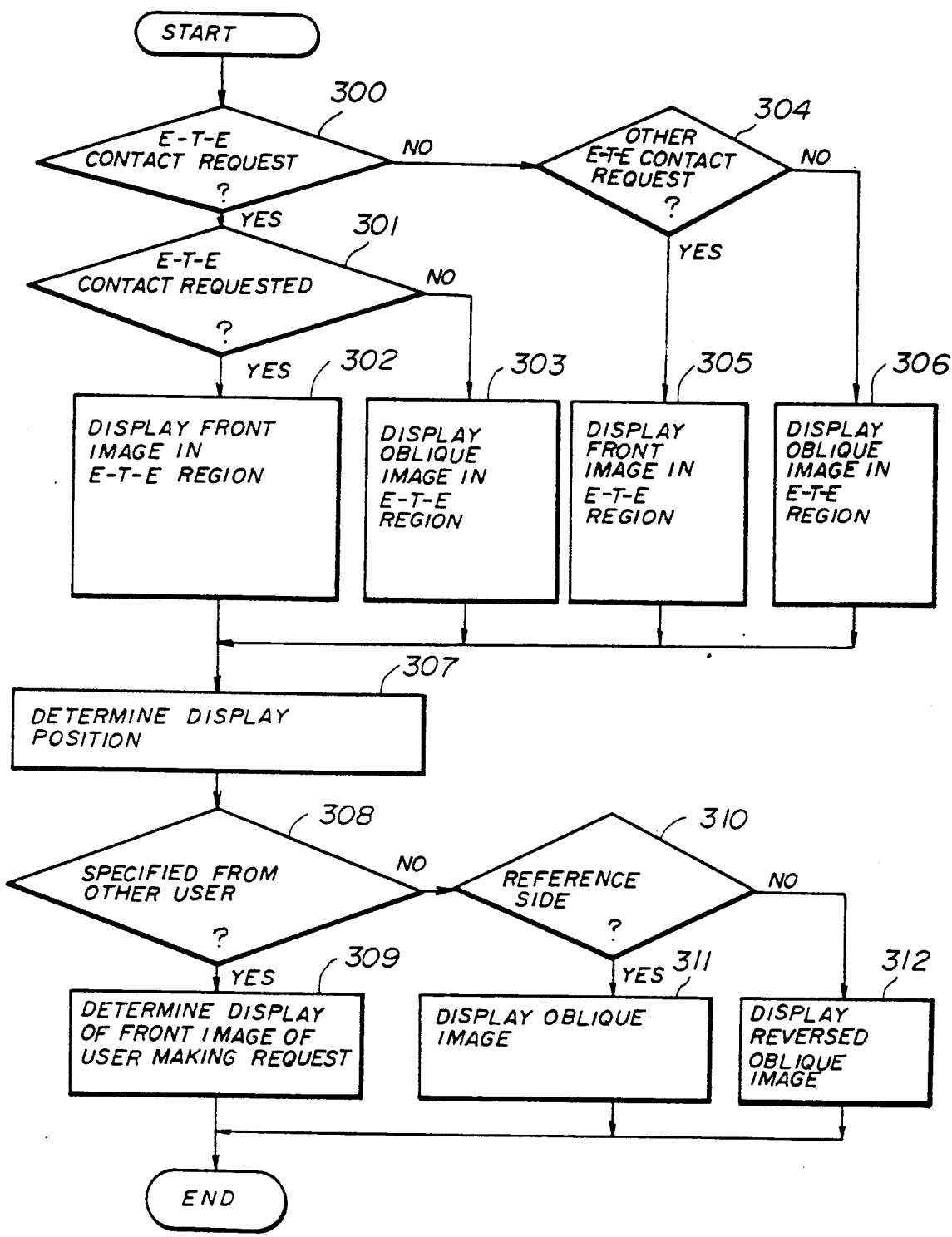
FIG. 11 is a flow chart for explaining the operation of a user image display deciding part shown in FIG. 9.

FIG. 11 is a flow chart for explaining the operation of the deciding part 65. The deciding part 65 decides the user which is to be displayed in the region (hereinafter referred to as the E-T-E region) where the eye-to-eye contact is possible and the kind of image to be displayed on the display part 62.

First, a step 300 decides whether or not the terminal user is requesting the eye-to-eye contact with a certain user of another terminal 60. If the decision result in the step 300 is YES, a step 301 decides whether or not the certain user is also requesting the eye-to-eye contact with the terminal user. If the decision result in the step 301 is YES, a step 302 displays the front image of the certain user in the E-T-E region of the display part 62. On the other hand, if the decision result in the step 301 is NO, a step 303 displays the oblique image of the certain user in the E-T-E region of the display part 62.

If the decision result in the step 300 is NO, a step 304 decides whether or not a user of other terminal 60 is requesting the eye-to-eye contact with the terminal user. If the decision result in the step 304 is YES, a step 305 displays the front image of this user in the E-T-E region of the display part 62. A plurality of users may be requesting the eye-to-eye contact with the terminal user, but in such a case, the priority with which the images of the users are displayed is determined time-sequentially depending on the time of request. On the other hand, if the decision result in the step 304 is NO, a step 306 displays in the E-T-E region the oblique image of a user which is determined in advance by the initial setting.

Next, the images to be displayed in the regions on the periphery of the E-T-E region of the display part 62 are determined. A step 307 determines the display region (position) of the images related to each of the users other than the certain user which is to be displayed in the E-T-E region based on the virtual user position relationship which is determined in advance by the initial setting.

Then, a step 308 decides whether or not each of the users of the other terminals 60 excluding the certain user which is to be displayed in the E-T-E region are requesting the eye-to-eye contact with the terminal user. A step 309 displays the front image in one of the peripheral regions if the decision result in the step 308 is YES. On the other hand, if the decision result in the step 308 is NO, a step 310 decides whether or not each user is to be displayed on the reference side (for example, left side; with respect to the E-T-E region. If the decision result in the step 310 is YES, a step 311 displays the oblique image of the user. On the other hand, a step 312 displays a right-to-left reversed oblique image of the user if the decision result in the step 310 is NO. Hence, in either case, the oblique image of the user is displayed if the decision result in the step 308 is NO.

Figure 12:
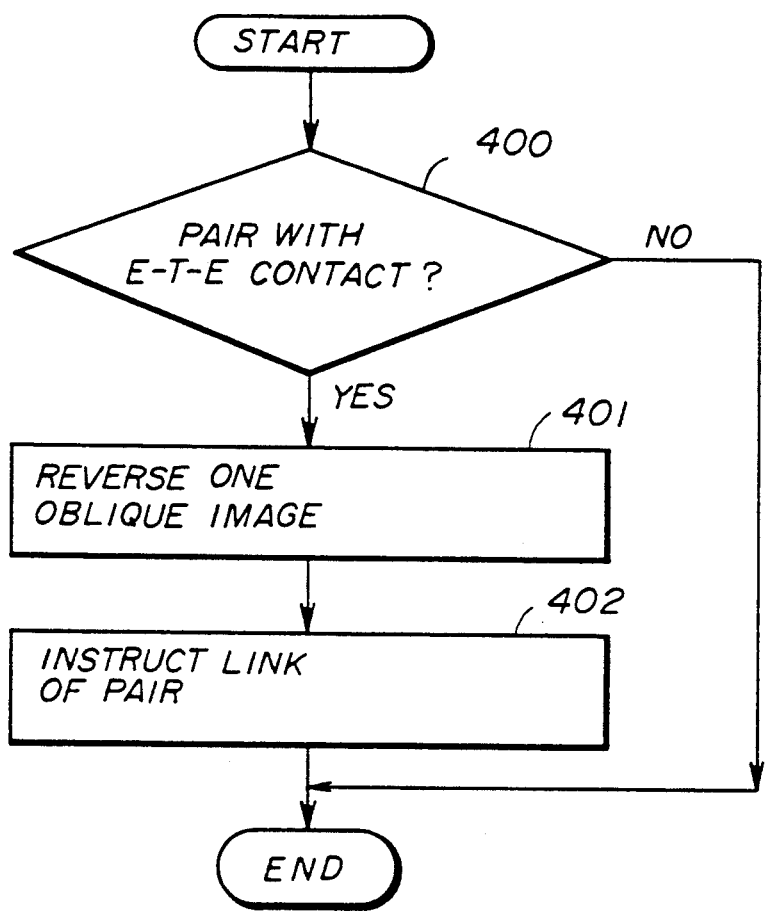
FIG. 12 is a flow chart for explaining the operation of an eye-to-eye contact relationship display deciding part shown in FIG. 9.

FIG. 12 is a flow chart for explaining the operation of the deciding part 66.

In FIG. 12, a step 400 decides whether or not there is a pair of users for which the eye-to-eye contact relationship presently exists out of all of the users of the terminals 60. The process ends if the decision result in the step 400 is NO. But if the decision result in the step 400 is YES, a step 401 reverses the right and left sides of the oblique image related to one of the users forming the pair and determines the display so that the pair of users face each other. In addition, a step 402 displays the link of the images related to this pair so that the relationship is easier to see.

Next, a description will be given of the video teleconference which is made in this embodiment among six users for a specific virtual user position relationship.

Figure 13:
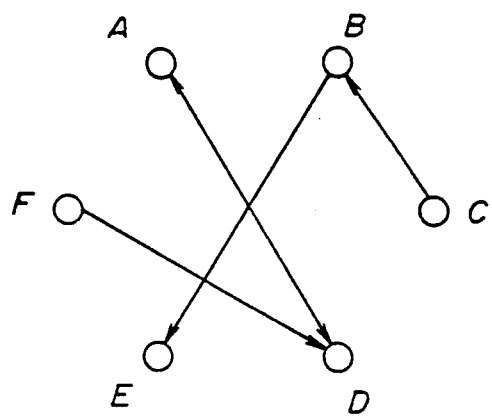
FIG. 13 shows the virtual user position relationship of six users and eye-to-eye contact requests made at a certain time.

FIG. 13 shows the virtual user position relationship of the six users and the eye-to-eye contact requests made at a certain time. In the state shown in FIG. 13, the eye-to-eye contact relationship stands between the users A and D. In addition, no user is making the eye-to-eye contact request with respect to the user E.

Figure 14:
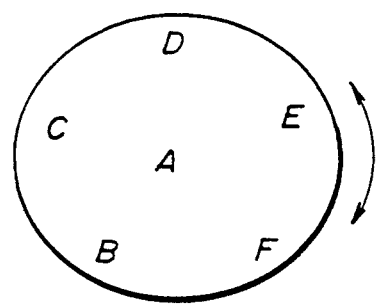
FIGS. 14 through 16 respectively show the position relationship shown in FIG. 11 viewed from the users A, B and C.
Figure 15:
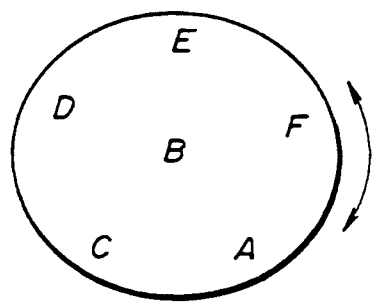
Figure 16:
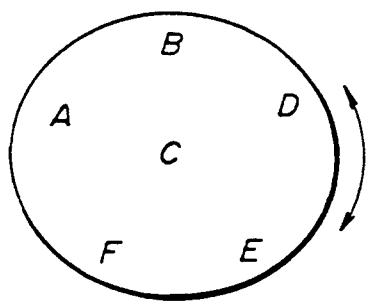

FIGS. 14 through 16 respectively show the position relationship shown in FIG. 11 viewed from the users A, B and C. The image of the user displayed in the E-T-E region changes depending which user makes the eye-to-eye contact request to which user, but the images of the users displayed in the peripheral regions to the E-T-E region are determined as if a turntable rotates as may be seen from FIGS. 14 through 16. In other words, the relative position relationship of the users is always the same.

Figure 17:
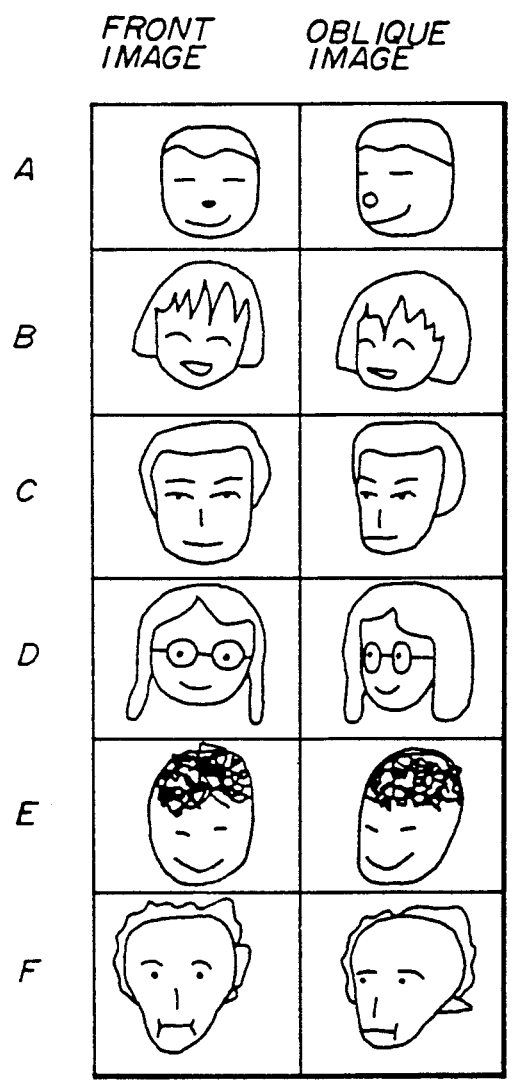
FIG. 17 shows the front and oblique images of the six users A through F picked up by cameras.

FIG. 17 shows the front and oblique images of the six users A through F picked up by the cameras 77 and 78. FIGS. 18 through 23 show examples of the display positions determined by the deciding parts 65 and 66 when the input information describes the relationship shown in FIG. 13. In FIGS. 18 through 23, "/F" denotes the front image, "/O" denotes the oblique image, and "/OR" denotes the oblique reversed image.

Figure 18:
FIGS. 18 through 23 show examples of the display positions determined by the deciding parts when the input information describes the relationship shown in FIG. 13.
Figure 19:
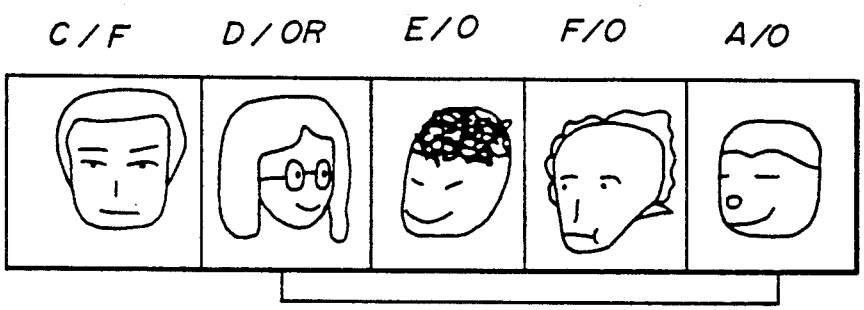
Figure 20:
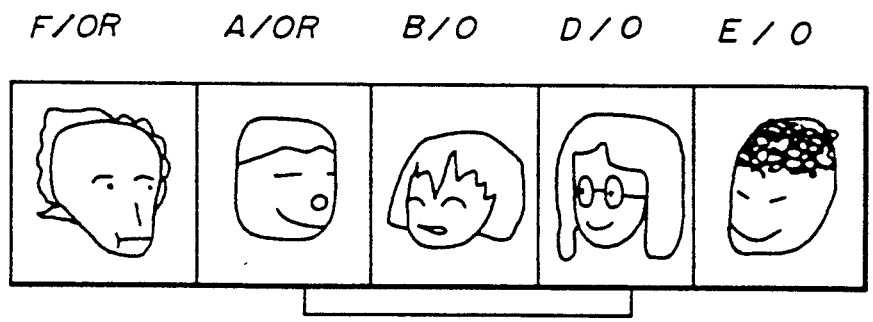

FIG. 18 shows the display part 62 of the user A, and the six users A through F are participating in a video teleconference related to the marketing plan for a new product. In this case, the E-T-E region for displaying the image of the user with whom the eye-to-eye contact relationship stands is located at the upper central part of the display part 62. In this example, the front image of the user D which is in the eye-to-eye contact relationship with the user A is displayed in this E-T-E region. The oblique images of the users E and F are displayed on the right of the E-T-E region based on the virtual user position relationship of FIG. 13. On the other hand, the oblique reversed images of the users B and C are displayed on the left of the E-T-E region based on the virtual user position relationship of FIG. 13.

FIGS. 19 through 23 respectively show the upper parts of the display parts 62 of the users B through F.

The user B is requesting the eye-to-eye contact with the user E. Hence, the image of the user E is displayed at the central part, that is, in the E-T-E region of the display part 62 of the user B, in FIG. 19. However, since the user E is not requesting the eye-to-eye contact with the user B, the oblique image of the user E is displayed in the E-T-E region. On the other hand, although the image of the user C is displayed on the left of the E-T-E region based on the virtual user position relationship of FIG. 13, this user C is requesting the eye-to-eye contact with the user B, and for this reason, the front image of the user C is displayed. In addition, because the users A and D are in the eye-to-eye contact relationship, the lower parts of the corresponding images are linked by a line to indicate this relationship.

The user C is requesting the eye-to-eye contact with the user B. Hence, the image of the user B is displayed in the E-T-E region of the display part 62 of the user C in FIG. 20.

Figure 21:
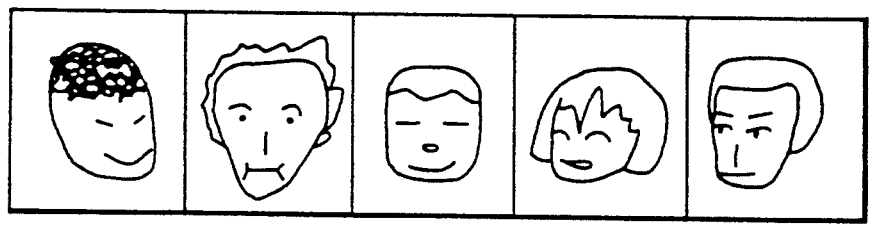

In FIG. 21, the front images of the users A and F are displayed on the display part 62 of the user D. Because the time when the user A made the eye-to-eye contact request with respect to the user D is earlier than the time when the user F made the eye-to-eye contact request with respect to the user D, the front image of the user A is displayed in the E-T-E region.

Figure 22:
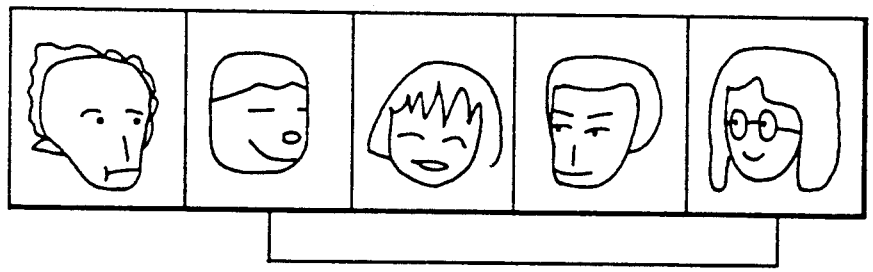

The user E is not making the eye-to-eye contact request to any of the users A through D and F. For this reason, the reference user which is determined in advance by the initial setting should originally be displayed in the E-T-E region of the display part 62 of the user E. From the relationship shown in FIG. 16, the image of the user C arranged on the opposite end from the user E is regarded as the reference user, for example. But in this particular case, the user B is making the eye-to-eye contact request to the user E, and for this reason, the front image of the user B is displayed in the E-T-E region of the display part 62 as shown in FIG. 22. In this case, if the user E notices that the user B is requesting the eye-to-eye contact with respect to the user E and the user E requests the eye-to-eye contact with respect to the user B in response thereto, the eye-to-eye contact relationship stands.

Figure 23:
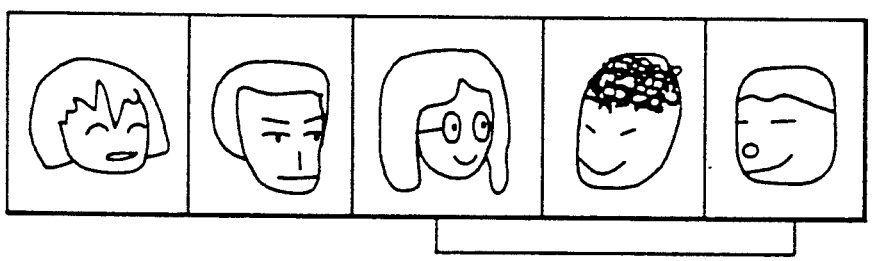

The user F is making the eye-to-eye contact request with respect to the user D. For this reason, the image of the user D is displayed in the E-T-E region of the display part 62 of the user F as shown in FIG. 23. Because the users D and A are in the eye-to-eye contact relationship, the oblique image of the user D is displayed in the E-T-E region. Furthermore, in order to facilitate the user F from understanding the eye-to-eye contact relationship between the users D and A, the oblique images of the users D and A are displayed so as to face each other. Thus, the oblique reversed image of the user D is displayed in the E-T-E region.

Next, a description will be given of an embodiment of the operation of the reverse image forming part 68 shown in FIG. 9, by referring to FIG. 24.

Figure 24:
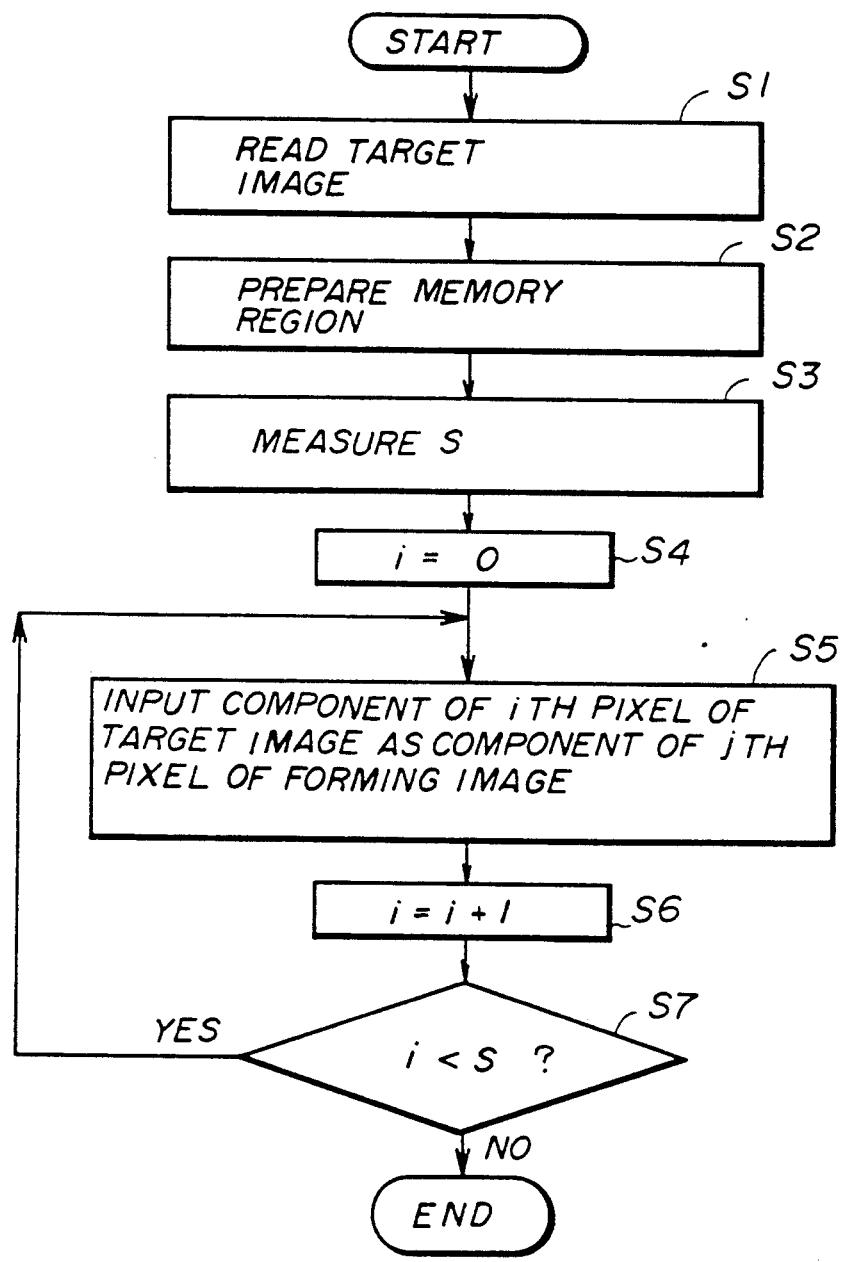
FIG. 24 is a flow chart for explaining an embodiment of the operation of the reverse image forming part shown in FIG. 9.

In FIG. 24, a step S1 reads a target image which is the subject of the display. A step S2 prepares therein a memory region having a memory capacity identical to the memory capacity required to store the target image. A step S3 measures the size S of the target image in terms of the number of pixels arranged from the left to right of the target image. A step S4 initializes a variable i to zero. A step S5 inputs the pixel component related to the ith pixel from the left of the target image as the pixel component related to the jth pixel from the left of a forming image, where j = S−i. Then, a step S6 increments i by one, and a step S7 decides whether or not i is less than S. The process returns to the step S5 if the decision result in the step S7 is YES, but the process ends if the decision result in the step S7 is NO. The forming image which is formed by this process is the reversed image in which the right and left sides of the target image are reversed.

Next, a description will be given of an embodiment of the operation of the displaying part 67 shown in FIG. 9, by referring to FIG. 25.

As described above, the deciding part 65 decides which one of the front image, the oblique image and the oblique reversed image is to be displayed. Based on this decision made in the deciding part 65, the deciding part 66 decides where the image of each user is to be displayed on the display part 62. The displaying part 67 displays the image decided in the deciding part 65 at the position decided by the deciding part 66.

Figure 25:
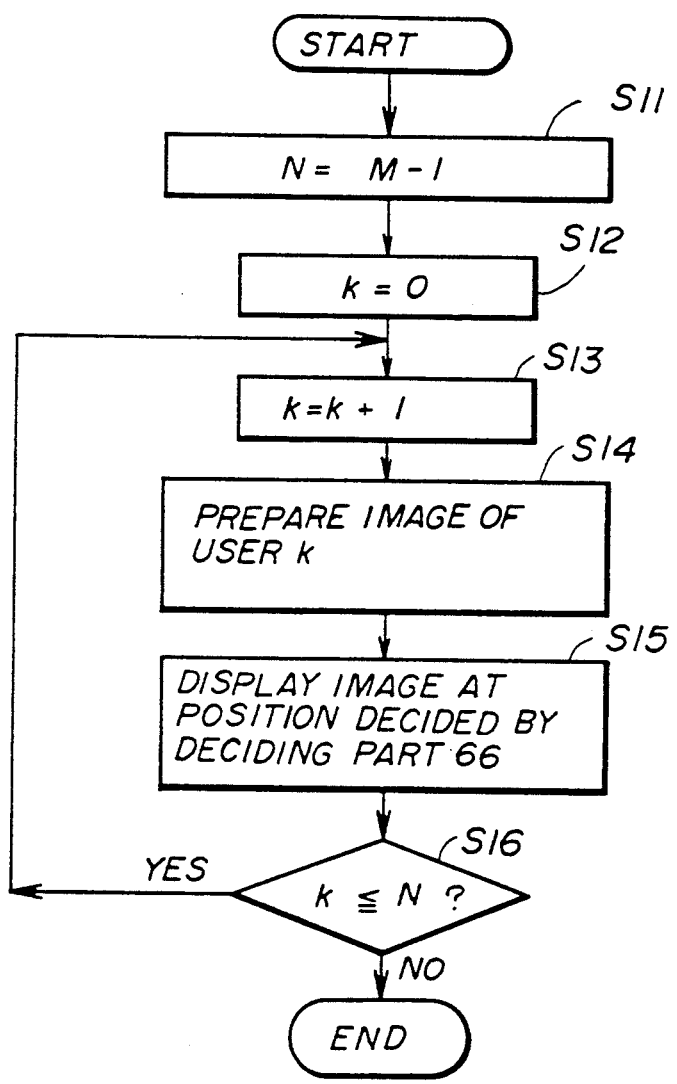
FIG. 25 is a flow chart for explaining an embodiment of the operation of the displaying part shown in FIG. 9.

In FIG. 25, a step S11 sets a variable N to N = M − 1, where M denotes the number of users. A step S12 initializes a variable k to zero, and a step S13 increments the k by one. A step S14 prepares the displaying image related to the user k. This displaying image is the front image, the oblique image or the oblique reversed image decided by the deciding part 65. Then, a step S15 displays the displaying image at the position decided by the deciding part 66. A step S16 decides whether or not k is less than or equal to N. The process returns to the step S13 if the decision result in the step S16 is YES, but the process ends if the decision result in the step S16 is YES.

Figure 26:
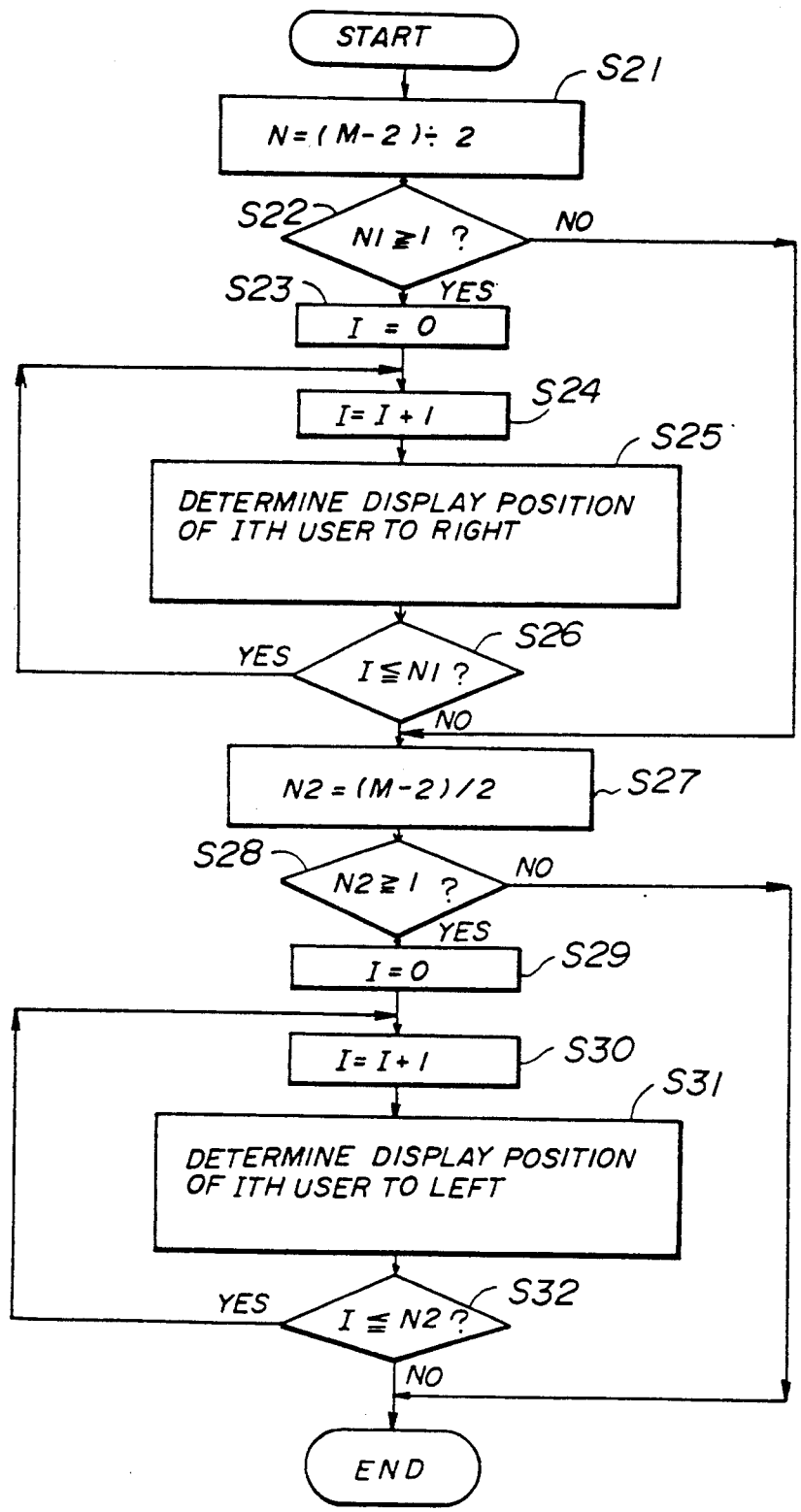
FIG. 26 is a flow chart for explaining an embodiment of the operation of a step 307 shown in FIG. 11.

Next, a description will be given of an embodiment of the operation of the step 307 shown in FIG. 11, by referring to FIG. 26. FIG. 26 shows the embodiment of the operation of the step 307.

When carrying out the step 307, the image of the user to be displayed in the E-T-E region of the display part 62 is already determined by the steps 300 through 306 shown in FIG. 11. Hence, the step 307 determines the images of the users to be displayed on the right and left of the E-T-E region shown in FIG. 18, for example.

In FIG. 26, a step S21 obtains N1 = (M−2)/2, where the figures of N1 below the decimal point are omitted. In this case, the terminal user and the user to be displayed in the E-T-E region must be excluded from the users to be displayed in the peripheral regions of the E-T-E region, and this is why 2 is subtracted from M. A step S22 decides whether or not N1 is greater than or equal to 1. If the decision result in the step S22 is YES, a step S23 initializes a variable I to zero, and a step S24 increments I by one. A step S25 determines the display position of the user who is located at the Ith position to the right of the user who is to be displayed in the E-T-E region in the virtual user position relationship shown in FIG. 13, to the Ith position to the right of the E-T-E region of the display part 62. Then, a step S26 decides whether or not I is less than or equal to N1. The process returns to the step S24 if the decision result in the step S26 is YES.

On the other hand, if the decision result in the step S22 or S26 is NO, a step S27 obtains N2 = (M−2)/2, where the figures of N2 below the decimal point are omitted. A step S28 decides whether or not N2 is greater than or equal to 1. If the decision result in the step S28 is YES, a step S29 initializes a variable I to zero, and a step S30 increments I by one. A step S31 determines the display position of the user who is located at the Ith position to the left of the user who is to be displayed in the E-T-E region in the virtual user position relationship shown in FIG. 13, to the Ith position to the left of the E-T-E region of the display part 62. Then, a step S32 decides whether or not I is less than or equal to N2. The process returns to the step S30 if the decision result in the step S32 is YES. On the other hand, the process ends if the decision result in the step S28 or S32 is NO.

In the described embodiments, the display part 62 includes one screen for displaying the users. However, it is also possible to use a plurality of display screens to display one user on each display screen, for example.

In addition, the display positions of the images of the users, including the position of the E-T-E region, are not limited to those of the described embodiment.

Further, the present invention is not limited to these embodiments, but various variations and modifications may be made without departing from the scope of the present invention.

WHAT IS CLAIMED IS

1. A video teleconferencing system comprising:
   a plurality of terminals;
   a server including storage means for storing input information; and
   a network coupling said terminals to said server,
   said input information being supplied from each terminal to other terminals from said server,
   each of said terminals comprising:
      input means including a first input part for inputting voice information, and a second input part for inputting image information, said voice information and said image information forming the input information of said input means, said second input part including a first camera for generating a front image and a second camera for generating an oblique image of a certain user of the terminal to which said input means belongs;
      display means coupled to said input means for displaying images of users of the terminals other than the terminal to which said display means belongs; and
      processing means coupled to said display means including first means for accepting specifying information which specifies a terminal, and second means for determining one of a front image and an oblique image to be displayed on the display means of each terminal other than the terminal to which said processing means belongs.

2. The video teleconferencing system as claimed in claim 1, wherein said second means of said processing means displays on said display means the front image of a user of a specific terminal which makes an eye-to-eye contact request to the terminal to which said second means belongs by the specifying information.

3. The video teleconferencing system as claimed in claim 2, wherein said second means of said processing means displays the front image of the user of the specific terminal at a predetermined position on said display means.

4. The video teleconferencing system as claimed in claim 3, wherein said second means of said processing means displays on said display means the oblique image of each user of a terminal other than the specific terminal.

5. The video teleconferencing system as claimed in claim 4, wherein said processing means further includes third means for determining a display position of each oblique image on said display means relative to the predetermined position depending on a virtual user position relationship which is preset and indicates a virtual position relationship of the users of said terminals.

6. The video teleconferencing system as claimed in claim 5, wherein said processing means further includes fourth means for forming an oblique reversed image by reversing right and left sides of the oblique image, and said third means determines a display position of each oblique reversed image on said display means relative to the predetermined position depending on the virtual user position relationship.

7. The video teleconferencing system as claimed in claim i, wherein said processing means further includes means for displaying on said display means a link between images of two users of terminals requesting eye-to-eye contact with each other.

8. The video teleconferencing system as claimed in claim 1, which further comprises means, coupled to said processing means, for generating the specifying information which requests an eye-to-eye contact with a user of an arbitrary terminal.

9. The video teleconferencing system as claimed in claim 1, wherein said input means further includes a third part for inputting console information, and said console information forms the input information together with the voice information and the image information.

10. The video teleconferencing system as claimed in claim 9, wherein said third part of said input means is coupled to said processing means and also generates the specifying information which requests an eye-to-eye contact with a user of an arbitrary terminal.

11. The video teleconferencing system as claimed in claim 1, wherein the second part of said input means includes a semitransparent mirror interposed between said display means and the certain user of the terminal to which said display means belongs, a first camera for picking up a front image of the certain user via said semitransparent mirror, and a second camera for picking up an oblique image of the certain user via said semitransparent mirror.

* * * * *